United States Patent [19]

Martino

[11] 3,758,654
[45] Sept. 11, 1973

[54] METHOD FOR BLOW MOLDING AN ARTICLE HAVING A TAIL PORTION WHICH CAN NOT COLLAPSE AGAINST AN ADJOINING WALL OF THE ARTICLE

[75] Inventor: Lawrence A. Martino, Trenton, N.J.
[73] Assignee: Monsanto Company, St. Louis, Mo.
[22] Filed: Oct. 14, 1971
[21] Appl. No.: 189,123

Related U.S. Application Data
[62] Division of Ser. No. 5,682, Jan. 26, 1970.

[52] U.S. Cl............... 264/98, 264/161, 425/302 B, 425/326 B
[51] Int. Cl. ................. B29c 17/07, B29c 17/12
[58] Field of Search ................ 264/94, 96, 98, 99, 264/161, 334; 425/326 B, 387 B, 302 B

[56] References Cited
UNITED STATES PATENTS
3,499,071 3/1970 Hurst.......................... 425/326 B X Primary Examiner—Donald J. Arnold
Assistant Examiner—J. H. Silbaugh
Attorney—James C. Logomasini et al.

[57] ABSTRACT

Method for preventing a tail portion of a blow molded article from collapsing against an adjoining wall of the article. Recesses in the walls defining the relief cavity within which the tail is shaped as the mold is closed form protrusions on both sides of the tail adjacent the adjoining wall which may be the article base, these protrusions coacting with the wall after opening the mold to prop the tail portion away from the wall and preferably maintain it in an erect position.

3 Claims, 3 Drawing Figures

Patented Sept. 11, 1973 3,758,654

INVENTOR
LAWRENCE A. MARTINO
BY
Michael J. Murphy
ATTORNEY

METHOD FOR BLOW MOLDING AN ARTICLE HAVING A TAIL PORTION WHICH CAN NOT COLLAPSE AGAINST AN ADJOINING WALL OF THE ARTICLE

This is a division of copending application Ser. No. 5,682 filed Jan. 26, 1970.

BACKGROUND OF THE INVENTION

This invention relates to molding and more particularly to shaping waste portions of plastic formed in molding, which are subsequently detached from the molded articles after ejection from the mold.

As an incidental part of the blow molding of articles from materials such as thermoplastics, a waste tail or fin portion is usually formed along the bottom of the mold between the mating sections during mold closing. Though generation of such a waste tail portion is undesirable from the standpoint of requiring recovery for an economical molding operation, closing the sections on a portion of the initial tube from which the article is formed positively centers the tube in the mold prior to blowing, and to this extent is desirable since it results in even wall distribution in the subsequently formed article. The tail portion is joined to the article by a web formed between mating edges of the mold sections, and which is desirably kept as thin as possible in order to facilitate later removal along the web.

After ejecting the article by opening the mold, the article with the tail portion attached is usually transported either manually or mechanically, such as by means of a conveyor, to a trimming station for removal of the tail. Since the tail is unsupported when the article is outside the mold and is attached only along a hinge like web, it is free to flop to either side about the web and against the base of the article. Thus, downstream trimming equipment which depends for successful operation on a tail position which is at least angularly and preferably vertically positioned with respect to an adjoining wall of the article is rendered ineffective. Wedging of the neck portion of one article between a confining equipment wall portion and the unstabilized tail portion of a previous article when the articles are bottles being passed through an unscrambler system have also caused equipment downtime in the past. Also, since it is desirable to minimize mold cycle time, both the article and tail are usually still hot when ejected from the mold and consequently the tail portion on contacting an adjoining portion of the article has a tendency to fuse either partially or completely to the article. This results in lost production time in an automated operation since an operator must disrupt production and take valuable time to pry the tail portion away from the article before passage into a downstream trimming station. The problem is especially acute when the articles are formed from the recently commercialized brittle types of thermoplastics, such as polymers based on vinyl chloride monomer, as well as other brittle types of polymeric materials specifically tailored to provide barrier and burst strength in the formed articles. Prying a tail of this type of material away from an adjoining wall of the article tends to cause cracking and/or crazing of the wall, which in turn results in a down graded or completely rejected product.

One way of overcoming the problem, of course, is to leave the blown article with the attached tail in the mold after forming for a period of time sufficient to cool the plastic to a temperature such that the parts will not weld to each other on contact. This, however, undesirably increases cycle time and therefore reduces the output of a blow molding installation. Another approach which has been tried is that of a non-linear pinch design defining the web attaching the tail to the article. This, however, creates weakened areas in the base of the article at the non-linear portions of the pinch weld because of the stress concentration developed in the plastic, which has been known to cause leakage problems when the articles are containers.

SUMMARY OF THE INVENTION

Now there has been developed a new technique for overcoming the aforementioned difficulties of the prior art.

Accordingly, it is an object of this invention to provide improved method for forming hollow articles.

Another object of this invention is to provide method for preventing a tail portion attached to a blow molded article from collapsing against an adjoining wall of the article.

A further object of this invention is to provide method for keeping a tail portion attached to a blown article after ejection from the mold in a substantially erect position without using auxiliary means other than the molded form of the article and tail portion and without changing the conventional linear pinch weld line in the area joining the tail portion to the article.

An additional object of this invention is to provide method of the aforementioned variety which is adapted for use with all types of thermoplastic materials, but especially so adapted for use with brittle types of thermoplastics such as vinyl based materials.

Other objects of this invention will in part be obvious and will in part appear hereinafter.

These and other objects are accomplished by providing a method of preventing the tail portion in a blown article from collapsing against an adjoining wall of the article which may be its base, the method comprising forming protrusions in both sides of the tail portion adjacent the wall of the article during mold closing the protrusions coacting with the wall of the article after opening of the mold to prop the tail portion away from the adjoining wall.

The apparatus utilized to carry out the method includes recesses formed in the walls defining a relief cavity wherein the tail portion is formed, the recesses being situated at a spaced distance from compressing surfaces or lands forming the pinch line and on either side of the parting line of the mold. These recesses form protrusions, which may take the form of nubs, on the tail for propping it against an adjoining wall portion of the article.

BRIEF DESCRIPTION OF THE DRAWINGS

In describing the overall invention, reference will be made to the accompanying drawings in which.

DETAILED DESCRIPTION OF THE INVENTION

Figure 1:
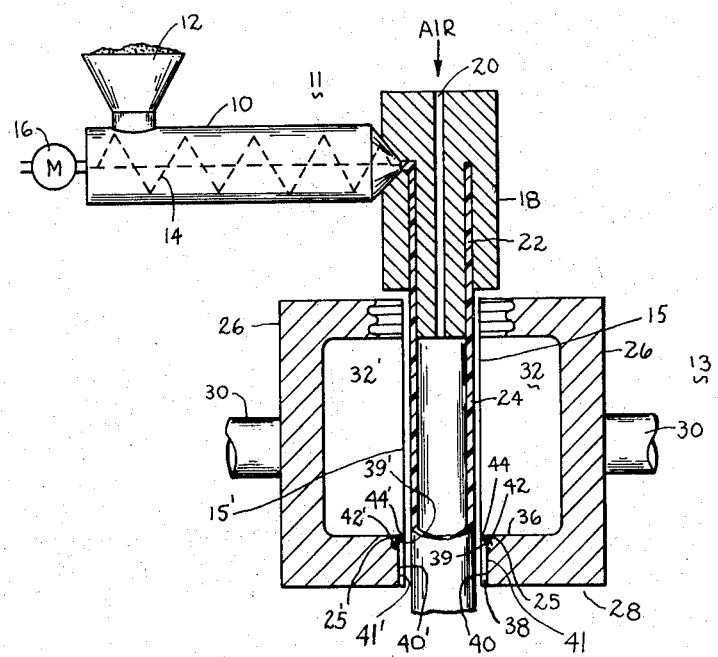
FIG. 1 is a sectional, schematic view of a form of the apparatus of the invention depicting molding of a container at an intial stage of the operation.

With reference to the drawings wherein identical numerals refer to identical parts, there is shown in FIG. 1 apparatus for blow molding thermoplastic materials. This apparatus comprises means, generally indicated as 11, for plasticating and forming a parison of plastic material. Mold means 13 are provided downstream of apparatus portion 11 and comprise at least two mated sections 26 and 26¹.

Hopper 12 is provided for holding a supply of a granular plastic material, such as a vinyl based thermoplastic, which is to be introduced to extruder 10. Heat is added to extruder 10 by conventional means, not shown, to fuse the plastic material therein. Mechanical force is applied by screw 14 positioned and aligned within extruder 10 and driven by motor 16 in order to force the resultant fused mass into die 18.

Die 18 has annular area 22 formed therein for forming and extruding parison 24 between sections 26 and 26¹ of open mold 28. Conventional means, not shown, are attached to each of shafts 30 and 30¹ for moving sections 26 and 26¹ toward and away from each other to close and part mold 28. Each section 26 has a cavity portion 32 in its parting face, with parting line 15 of mold 28 extending along these faces. A pinch off device 36 is provided about the countour of caving sections 32 and comprises compressing surfaces or lands 25 and 25¹ situated on either side of parting line 15, and which are on the order of 0.015 in vertical height. Mold 28 beyond lands 25 in a direction away from cavity 32 has relief cavity 38 formed therein which is defined by wall sections 40 and 40¹. Wall sections 40 comprise outwardly flaring portions 39 and vertically disposed portions 41 at the outer ends of portions 39. Wall sections 40 and 40¹ have recesses 42 and 42¹ formed therein at a spaced distance below the lower edge of compressing surfaces 25 and 25¹ of pinch off device 36. In the illustrated embodiment, recesses 42 are located at the junction of flaring portions 39 and vertically disposed portions 41.

Means are provided to admit a positive pressure medium to parison 24 issuing from die 18 to apparatus portion 11 and may comprise a central passage 20 for introducing pressurized air into mold means 13. Obviously passage 20 could be in a separate blow head disassociated from die 18.

Figure 2:
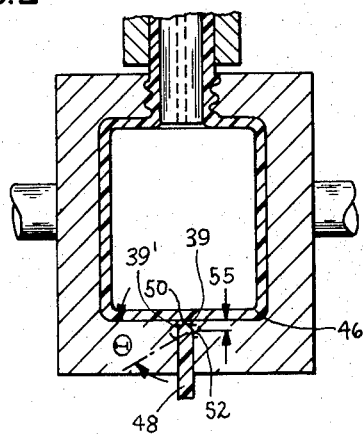
FIG. 2 is a view similar to FIG. 1 after the container is formed.

In FIG. 2, mold sections or halves 26 are in a clamped closed position, having been moved together by suitable means acting on shafts 30, with parison 24 having been formed therein into container 46 conforming to the shape of cavity sections 32. The portion of parison 24 extending beyond article cavity 32 has been compressed in relief cavity 38 between wall portions 40 to form tail portion 48 on closing sections 26 on each other. This tail portion 48 is attached to article 46 by means of web 50 which corresponds to the vertical height of compressing surfaces 25. Also, as a result of the closing action of mold halves 26, cylindrical protrusions or nubs 52 have been formed, basically by compression molding, on the opposing sides of tail portion 48 within relief cavity 38. The shape of these protrusions is defined by the contour of recesses 42 in wall portions 40.

Figure 3:
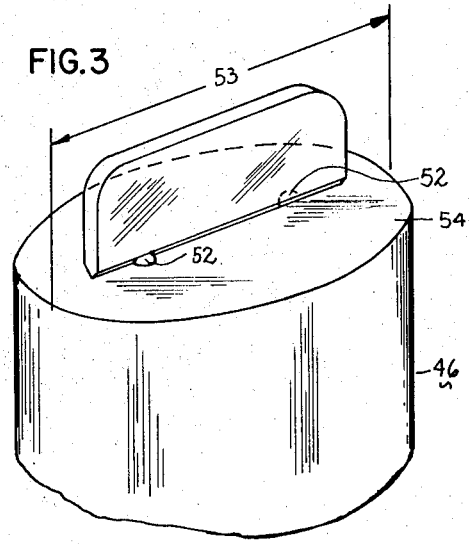
FIG. 3 is a partial, perspective view of the container of FIG. 2 after its ejection from the mold.

After article 46 with attached tail portion 48 has remained in contact with cooled walls of mold 28 for a time sufficient to reduce the temperature thereof such as to avoid deformation or substantial shrinkage, they are discharged by separating sections 26 along the parting line. As can be seen from FIG. 3, at any time subsequent to this and prior to tail removal, protrusions 52 coact with the adjoining wall portions 54 of article 46, which, in this case is the base of a container, so as to prop the tail portion against base 54 and therefore keep it in a substantially erect position generally parallel to the axis of the container and perpendicular to base 54. Thus, if tail portion 48 begins to collapse by gravity toward base 54, about the web attaching it to the article, it is prevented from coming into contact with the base by means of protrusions or nubs 52 which essentially act as wedges between the tail and base 54 to prevent the tail from moving any further. Siince the amount of surface contact between the protrusions and the base is insignificant, no problematical sticking of the type previously described occurs. As can be appreciated from FIG. 3, a conventional linearly uninterrupted tail pinch extending perpendicular to the container axis will still be maintained in the finished article after tail portion 48 has been removed. Thus, uneven stress build up in the plastic caused by a non-linear pinch of the type which has caused failure along base 54 is avoided.

The above description and particularly the drawings are set forth for purposes of illustration only and are not to be taken in a limited sense.

The recesses in the walls defining the relief cavity wherein a special tail portion is formed according to the present invention may be of any cross sectional shape and may be either elongated in a continuous manner along the width of the mold next to the mold pinch lands or compressing edges on either side of the parting line. They may be interrupted in the sense that they comprise one or more recesses on each side of the parting line. The latter arrangement is preferred in order to minimize contact between the resulting nubs formed on the tail and the adjoining wall of the article. The number and placement of the recesses will vary with the size of the article and therefore with the transverse dimension of the tail portion generated during molding. Preferably the depressions are formed in the walls of the relief cavity at an acute angle $\theta$ (FIG. 3) with the adjoining wall portion of the article cavity. $\alpha$ is generally maintained at an angle of between about 30° to 60° for optimum results and preferably on the order of 45° to keep the tail portion in a substantially erect position.

The depressions may be vertically and horizontally formed anywhere in the walls of the relief cavity as long as the mold can be opened and the resulting protrusions formed on the tail portion keep the tail away from the adjoining wall portion of the article. Preferably, the recesses are located in the area of the junction of outwardly flaring and vertically disposed wall portions of the relief cavity for optimum results. The nubs formed on the tail portion for an interrupted design tend to lose their effectiveness as the recesses are moved vertically down the relief cavity, since the portion of the tail formed by the outwardly flaring wall portion of the cavity will contact the adjoining wall of the article prior to the nubs on collapse of the tail. Likewise, the depth of the recesses, especially for an angular positioning, should be between 0.020 to 0.375 inch and preferably between 0.040 to 0.250 inch from the walls of the relief cavity. For depths less than 0.020 inch, the resulting nubs generally lose their effectiveness, while at depths greater than 0.375 inch the mold sections cannot conveniently be parted to remove the article, and also thinning along the pinch line occurs. The transverse or horizontal position of the recesses on the walls of the relief cavity on either side of the parting line should lie within an imaginary plane defined by the maximum transverse dimension of the article cavity portion of the mold (53 in FIG. 3) taken in a direction perpendicular to the parting line.

It will be understood that many variations and modifications of the embodiments herein described will be obvious to those skilled in the art, and may be carried out without departing from the spirit and scope of the invention as hereinafter claimed.

I claim:

1. In forming a hollow article by closing opposing sections of a blow mold on a thermoplastic parison, said closing causing collapse of a portion of said parison to form a waste tail portion, blowing an uncollapsed portion of said parison to form the article, moving said sections away from each other to open said mold without separating the tail portion from attachment with the blown article and then severing said tail portion from the article downstream of the mold the improvement which comprises forming supporting protrusions on both sides of said tail portion within recesses in said mold sections during closing of said mold sections, said recesses being shaped to allow release of said protrusions therefrom during opening of said mold sections so that said tail portion and protrusions remain attached to said article, and allowing the tail portion to pivot about its connection with an adjacent wall of the blown article after opening said mold to bring said protrusions into temporary abutment with said wall to keep the surface of the tail portion spaced from said wall prior to said severing.

2. The method of claim 1 wherein the tail portion and the article are made of a vinyl based thermoplastic.

3. The method of claim 1 wherein the adjoining wall is the base of the article.

* * * * *